No. 692,980. Patented Feb. 11, 1902.
C. H. BRYAN.
RUBBER TIRE.
(Application filed Jan. 28, 1901.)
(No Model.)
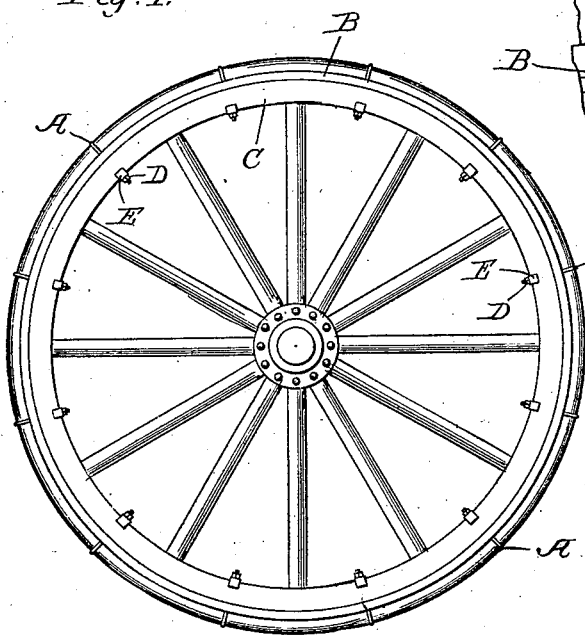
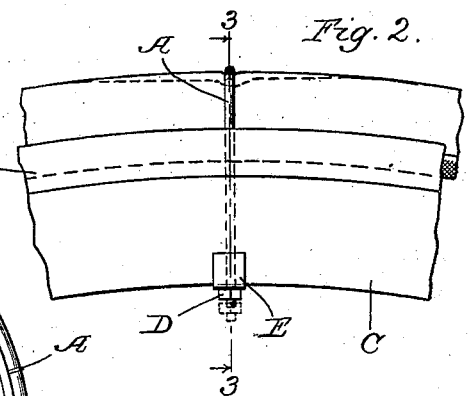
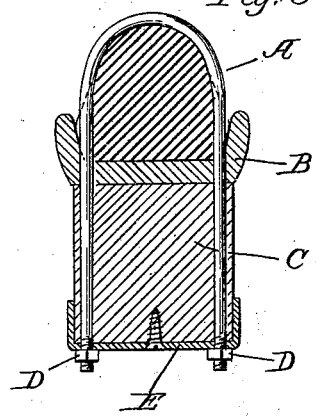
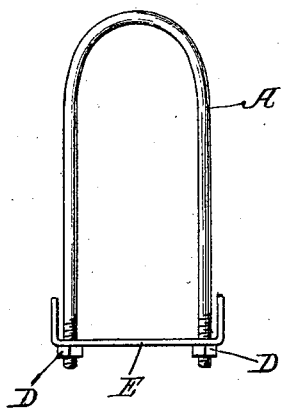
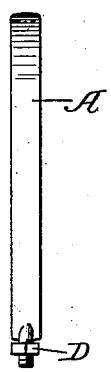
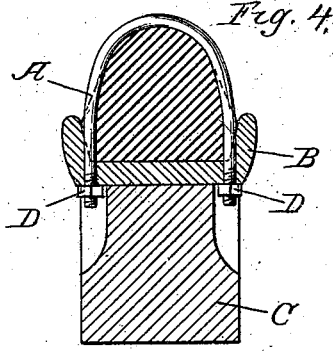
Witnesses.
Edward T. Wray,
Homer L. Kraft
Inventor:
Clarence H. Bryan
by Parker & Carter
Atty's.
THE NORRIS PETERS CO., PHOTO-LITHO., WASHINGTON, D. C.

UNITED STATES PATENT OFFICE.

CLARENCE H. BRYAN, OF CHICAGO, ILLINOIS, ASSIGNOR OF ONE-HALF TO JAMES WEBSTER, OF CHICAGO, ILLINOIS.

RUBBER TIRE.

SPECIFICATION forming part of Letters Patent No. 692,980, dated February 11, 1902.

Application filed January 28, 1901. Serial No. 45,008. (No model.)

*To all whom it may concern:*

Be it known that I, CLARENCE H. BRYAN, a citizen of the United States, residing at Chicago, in the county of Cook and State of Illinois, have invented certain new and useful Improvements in Rubber Tires, of which the following is a specification.

My invention relates to rubber tires for vehicles, and has for its object to provide a new and improved construction of this description.

My invention is illustrated in the accompanying drawings, wherein—

Figure 1 is a view of a wheel, showing the application of my invention. Fig. 2 is an enlarged view showing a portion of the rim of the wheel with the tire in place. Fig. 3 is a sectional view on line 3 3, Fig. 2. Fig. 4 is a view showing a modified construction. Fig. 5 is an enlarged view showing one form of holding device removed from the wheel. Fig. 6 is a view of the holding device, showing a modified construction.

Like letters refer to like parts throughout the several figures.

Many objections and difficulties have heretofore accompanied the use of elastic tires upon vehicles of various kinds. Such tires are commonly held in position by means of a holding device, which passes around the wheel and is contained within the substance of the tire. Such a device soon cuts its way through the tire, and said tire is destroyed long before it is worn out. In addition to this the tires heretofore constructed have a tendency when compressed to spread laterally over the edge of the channel in which they are contained, so that they are cut and mutilated by said channel or other confining device. Said tires also creep around the wheel, and this creeping tends to hasten the destructive effect of the holding device. My invention has for its object to remedy this and other evils and to provide a holding device which shall properly hold said tire in position and which confines the rubber tire so as to hold it in proper relation, and yet automatically adjust itself to the varying conditions presented.

Referring now to the drawings, wherein I have shown one form of my invention, I provide a series of holding devices A, which pass around the outer boundary of the tire at suitable intervals, so as to encompass it and confine it. This holding device passes through the channel or other confining device B, upon which the tire is mounted, and also passes through openings in the rim or felly C of the wheel. Said confining device is free to move in and out in a radial direction, but is provided with certain limiting parts or devices D, which limit its outward movements—that is, its movement away from the hub of the wheel. These holding devices may be spaced about the wheel in any manner desired, the number depending, of course, upon the size of the wheel and the conditions to be met. As shown in Figs. 2 and 3, this holding device consists of a wire loop which passes around the outer boundary of the tire. The ends of the loops are screw-threaded for a portion of their length, and the limiting device consists of nuts working on these screw-threaded ends. When the ends of the holding device pass through the rim or felly of the wheel, I prefer to provide a protecting device or clip E, through which said ends pass. This clip is preferably attached to the felly of the wheel in any desired manner, so as to be fixed against movement, and prevents the felly or the paint or varnish thereon from being injured by the reciprocating or repeated in-and-out movement of the holding device. It is of course evident that this holding device may be of some other construction and may be of other material than wire. I have shown one other form in Fig. 6, in which said holding device consists of a flat strip extending around the outer boundary of the tire. These two constructions show that this device may be varied, and I of course do not limit myself to such constructions, as various devices for this purpose will readily occur to those versed in the art.

In Fig. 4 I have shown a construction wherein the holding device does not project through holes in the felly, but simply through holes in the channel or confining device B, the felly being formed or cut away or otherwise adapted to permit the in-and-out movement of the holding device. I have simply illustrated these different arrangements to indicate that various forms and constructions can be used without departing from the spirit of my invention. It will be noted that the holding device for the tire engages the confining device for said tire inside of its outer or exposed sides or faces. This construction, among other things, prevents pressure or wear upon the holding device, which would result if the holding device passed around the confining device, so as to be exposed at the sides. It is of course evident that the confining device may be of any desired construction. The limiting device is preferably made adjustable, so that it can be changed in position as desired.

When my construction is used, the tire may be placed in position in any desired manner, preferably by being formed in an endless tire somewhat smaller than the channel B and then stretched over said channel and placed in position. The holding devices are then placed in position.

As the wheel rolls along the various holding devices come into contact with the ground, and pressure is applied to them and the tire at this point. The tire being elastic of course gives, and the holding devices being free to move radially also give, said devices taking the position shown (exaggerated) in dotted lines in Fig. 2. When the pressure is relieved, the tire expands, and the holding device is moved back to its normal position. It will thus be seen that said holding devices are automatically adjustable. Said holding devices also confine the tire, so as to prevent it from spreading out laterally and being injured by the edges of the channel or other confining device. It will also be seen that the tire can be made perfectly solid, it being unnecessary to have any openings for any holding device. As the wheel rolls along it has been found that the tire creeps around said wheel, due to the contact with the ground or other surface over which the wheel is passing. My invention permits this creeping of the tire without injury thereto. It will be seen that as the tire creeps said tire changes in position with relation to the various holding devices, so that they are not continually in engagement at any given point. This of course adds to the life of the tire.

In applying this tire it is not necessary to resort to any compression, as is the custom with tires now upon the market, but the tire is easily and quickly placed in position, and the evils and wearing effect of the various appliances for holding it in position now upon the market are entirely obviated.

I claim—

1. The combination with an elastic tire, of a series of holding devices which pass around the outer boundary of the tire and movably engage some parts of the wheel, said holding devices separated by extended free portions of the elastic tire, each holding device free to move in and out, and provided with a limiting device which limits its outward movement.

2. The combination with an elastic tire, of a looped holding device, looped about the outer boundary of the tire, the ends of the holding device movably engaging some part of the wheel so as to be free to move radially, and a limiting device adjustably connected with said ends.

3. The combination with an elastic tire of a confining device about which the tire passes, a holding device for holding the tire in position, said holding device passing around the tire and engaging the confining device inside of its outer or side faces so as to leave said outer or side faces free from said holding device.

4. The combination with an elastic tire, of an automatically-adjustable holding device, consisting of a part looped about the outer boundary of the tire, and passing through the channel or rim of the wheel, said device free to move in and out, a protecting part on the rim of the wheel through which said device passes, and limiting devices connected with the holding device, for limiting its outward movement.

5. The combination with an elastic tire, of a holding device, consisting of a piece of material looped about the outer boundary of the tire, the ends of the loop passing through some part of the wheel so that the loop is free to move in and out, said ends being threaded, and being provided each with a nut which limits the outward movement of the holding device.

6. The combination with an elastic tire, of a holding device, consisting of a piece of rigid or stiff material, looped about the outer boundary of the tire, the ends of said loop passing loosely through holes in the felly of the wheel, said ends provided with a limiting device which engages the inner face of the felly of the wheel or some part associated therewith, and limits the outward movement of the holding device, so that the holding device is free to automatically adjust itself when pressure is applied to it.

7. The combination with an elastic tire of a holding device with disconnected ends, which passes around the outer boundary of the tire and movably engages some part of the wheel, and an adjusting device associated with said disconnected ends of said holding device, the movement of said holding device adapted to be regulated by the adjusting device.

8. A wheel for vehicles, comprising a wheel proper, an elastic tire passing therearound, a confining device in which the elastic tire is loosely held, a series of comparatively small holding devices which pass around the outer boundary of the tire at intervals and which leave the greater part of the periphery of the tire exposed, said holding devices movably connected to some part of the wheel, whereby the tire is free to creep around the wheel.

9. The combination with an elastic tire of a confining device extending around the tire and projecting in or through the holding device at points inside of the outer or exposed faces, said holding device movably connected with the confining device.

CLARENCE H. BRYAN.

Witnesses:
  HOMER L. KRAFT,
  EMILY SCHAFF.